(12) United States Patent
Allport et al.

(10) Patent No.: US 6,291,818 B1
(45) Date of Patent: Sep. 18, 2001

(54) SENSOR PACKAGE MANUFACTURE OPTIMIZATION

(75) Inventors: Robert W. Allport, Harlow; Graeme Ferrari, Cambridgeshire; Paul Mitchell; David Morgan, both of Hertfordshire, all of (GB)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/274,043

(22) Filed: Mar. 22, 1999

(51) Int. Cl.[7] ............................. H01J 5/02; G01N 21/88; H01L 21/44
(52) U.S. Cl. .................. 250/239; 250/559.3; 438/106; 438/116
(58) Field of Search ............................. 250/239, 559.29, 250/559.3; 438/106, 116

(56) References Cited

U.S. PATENT DOCUMENTS

| | | | |
|---|---|---|---|
| 4,743,772 | * 5/1988 | Hefele et al. | 250/559.29 |
| 5,565,674 | * 10/1996 | Reele | 250/239 |
| 5,801,374 | * 12/1998 | Cambell et al. | 250/208.2 |
| 6,096,575 | * 8/2000 | Okada et al. | 438/106 |

* cited by examiner

*Primary Examiner*—Georgia Epps
*Assistant Examiner*—Saeed Seyrafi
(74) *Attorney, Agent, or Firm*—Christopher J. Capelli; Michael E. Melton

(57) ABSTRACT

In order to locate a package (110) which houses active elements including an opto-electric type transducer (100), in a position which assures that the opto-electric sensor and other active elements will be located in proper operative positions when the package is installed in predetermined piece of apparatus, the package casing (102) is provided with location features (112) at least some of which are deformable. During optimization, the package is moved with respect to a target until such time as the sensor is detected as producing an optimal output. Selected location features are then deformed to form location faces (112*a*) which have a predetermined spatial relationship with the active elements and which ensure that the active elements will be supported in an optimally operative position when the package is operatively disposed in a device such as an optical scanner or the like.

8 Claims, 6 Drawing Sheets

SENSOR PACKAGE MANUFACTURE OPTIMIZATION

FIELD OF THE INVENTION

The present invention relates generally to a process and apparatus which compensates for manufacturing variations and more specifically to a process which enables production and assembly errors, associated with the active components in a sensor assembly package, to be quickly and easily compensated for.

BACKGROUND OF THE INVENTION

The accuracy of a sensor arrangement is determined by the relationship between its electronic components and the packaging (housing) that locates the active elements of the sensor in space. Under normal circumstances any errors in the packaging of the elements of the assembly will result in an error in the final position of the active sensor elements with respect to the article/object which is to be scanned and/or otherwise subjected to inspection.

In the case a sensor arrangement includes a lens array which is designed to focus an image on a photo responsive device, such as a charge couple device (CCD) or the like type of opto-electric transducer, any error in the setting of the lens array with respect to the transducer, or vice versa, is apt to cause a blurring, distortion or the like, of the image/data which is developed. The problem is further compounded in the instance that a mirror or prism is used to direct the image into the lens array in that any deviations in the angle and disposition of the mirror with respect to the lens array is, of course, apt to induce accuracy problems.

In devices such as image readers and scanners which are used to read information printed on the surface of an article such as a sheet of paper, envelope, etc., accuracy is paramount and any constructional/assembly errors which reduce this accuracy are apt to render the device partially or totally inoperative for its intended purpose.

The active elements, such as the lens array and the opto-electric transducer may be incorporated into a subhousing or casing which is adapted to be mounted in the interior of a larger device, such as an optical scanner or the like. However, if these active elements are not precisely located within the sub-housing in a manner wherein the combined effect of the various deviations, which occur as a result of manufacturing and/or assembly, does not fall in an acceptable range, then the whole unit will produce unacceptable results. This, of course, results in the rejection of the unit.

In order to reduce/eliminate the number of units which are rejected for the above mentioned reason, it is necessary to tighten the manufacturing tolerances on each of the individual components as well as those pertaining to their assembly, so as to reduce unnecessary expense of rejecting a fully assembled unit. This of course raises the manufacturing costs and reduces productivity.

Circumnavigating these problems is difficult in as much as there is a tendency to use the unit housing as a reference and attempt to locate all of the elements which are disposed therein, in a very precise spatial relationship with respect to the housing and thus produce a unit which can be mounted in a larger device using preformed location features.

U.S. Pat. No. 5,565,674 discloses an example of the above mentioned type of arrangement. As shown in FIG. 1, this arrangement includes an optical package 10 having a molded, optically clear body 12 surrounding the central portion of a wing-shaped support 14. This support has two wing-shaped portions 16A and 16B with mounting holes 18A and 18B extending therethrough for receiving mounting screws and permitting the optical package 10 to be mounted to the head of an optical CD read/write system. With this arrangement it is clear that if the active elements are, for any reason, not located within a predetermined tolerance with respect to the mounting holes 18A, 18B then the package is apt not to come up to specification and to be subject to rejection.

BRIEF SUMMARY OF THE INVENTION

The present invention is directed to an optimization technique which attenuates the above problem. More specifically, the technique is such that, after a package or unit is assembled, the package is moved with respect to a target and when a response of a sensor which is included in the package, responds to the target in a predetermined manner, indicating that the active element or elements in the package are suitably located with respect to the target, a location feature or mount is permanently deformed to form a location face. The location face is then used to located the package in a device in a manner wherein, irrespective of the minor deviations within the unit, the unit per se will, after final assembly of the device of which the unit forms a part, be supported in a position wherein acceptable operational characteristics will be derived.

It is an object of the invention to provide a technique whereby one or more location features on the case or unit which houses active elements such as a CCD, to be deformed by swaging or the like, in a manner which will ensure that the casing can be mounted in a device and support the active elements in space in a desired relationship with respect to a target.

In brief, in order to achieve the above objects and to locate a package casing which houses active elements including a sensor, in a position which assures that the sensor and other active elements will be located in a proper operative position when installed in a predetermined piece of apparatus, the package casing is provided with location features and is moved with respect to a target until such time as the sensor is detected as producing an optimal output. Under these conditions, one or more selected location features are deformed using a swaging tool or the like, to form location faces which have a predetermined spatial relationship with the active elements and which ensure that the active elements will be supported in an optimally operative position when the package is mounted in a device such as an optical scanner or the: like.

More specifically, a first aspect of the present invention resides in a method of optimizing comprising the steps of: forming a case with at least one location features, and disposing a sensor, which is provided either alone in combination with a plurality of other active elements, within the case in a predetermined relationship with respect to the case. The case is then selectively moved with respect to a target while the response of the sensor to the target (via, the sensor output) is monitored. When the sensor response meets a predetermined requirement, the movement of the case is halted and a location feature is deformed to form a location face. This face has a predetermined spatial relationship with the active elements within the case and locates the active elements in an optimal operating position when the case is mounted in a predetermined device.

A second aspect of the present invention resides in an optimizing apparatus comprising: means for supporting a case which has one or more location features and in which a sensor, which is either provided alone or in combination with one or more other active elements, is supported in a predetermined relationship therein; means for selectively moving the case with respect to a target; means for monitoring the response of the sensor to the target and for halting the movement of the case when the sensor output (viz., response) meets a predetermined requirement; and means for permanently deforming a selected location feature to form a location face which has a predetermined spatial relationship with sensor and which locates the sensor and/or active elements in a predetermined operative position when the case is mounted in a predetermined device.

BRIEF DESCRIPTION OF THE DRAWINGS

The various merits and advantages of the present invention will become more clearly appreciated as a detailed description of the preferred embodiment is given with reference to the appended drawings in which.

DETAILED DESCRIPTION OF THE INVENTION

Figure 1:
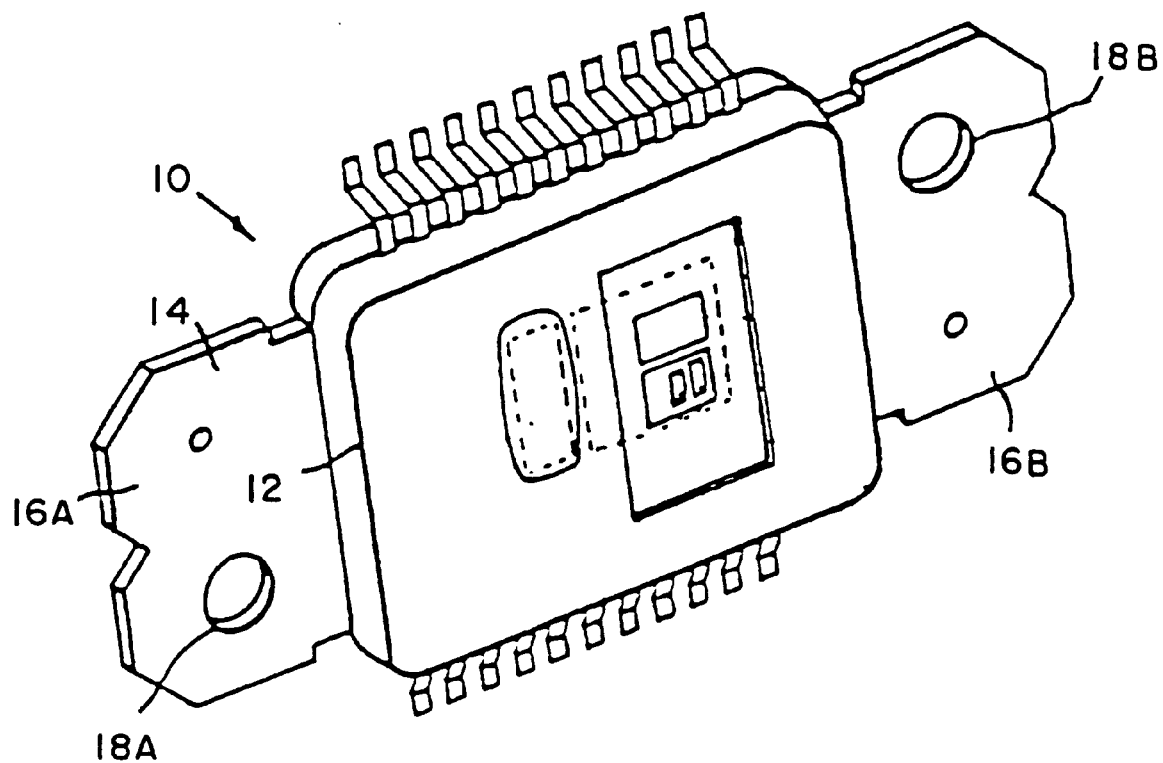
FIG. 1 is a perspective view of a package discussed in the opening paragraphs of the instant disclosure.
Figure 2:
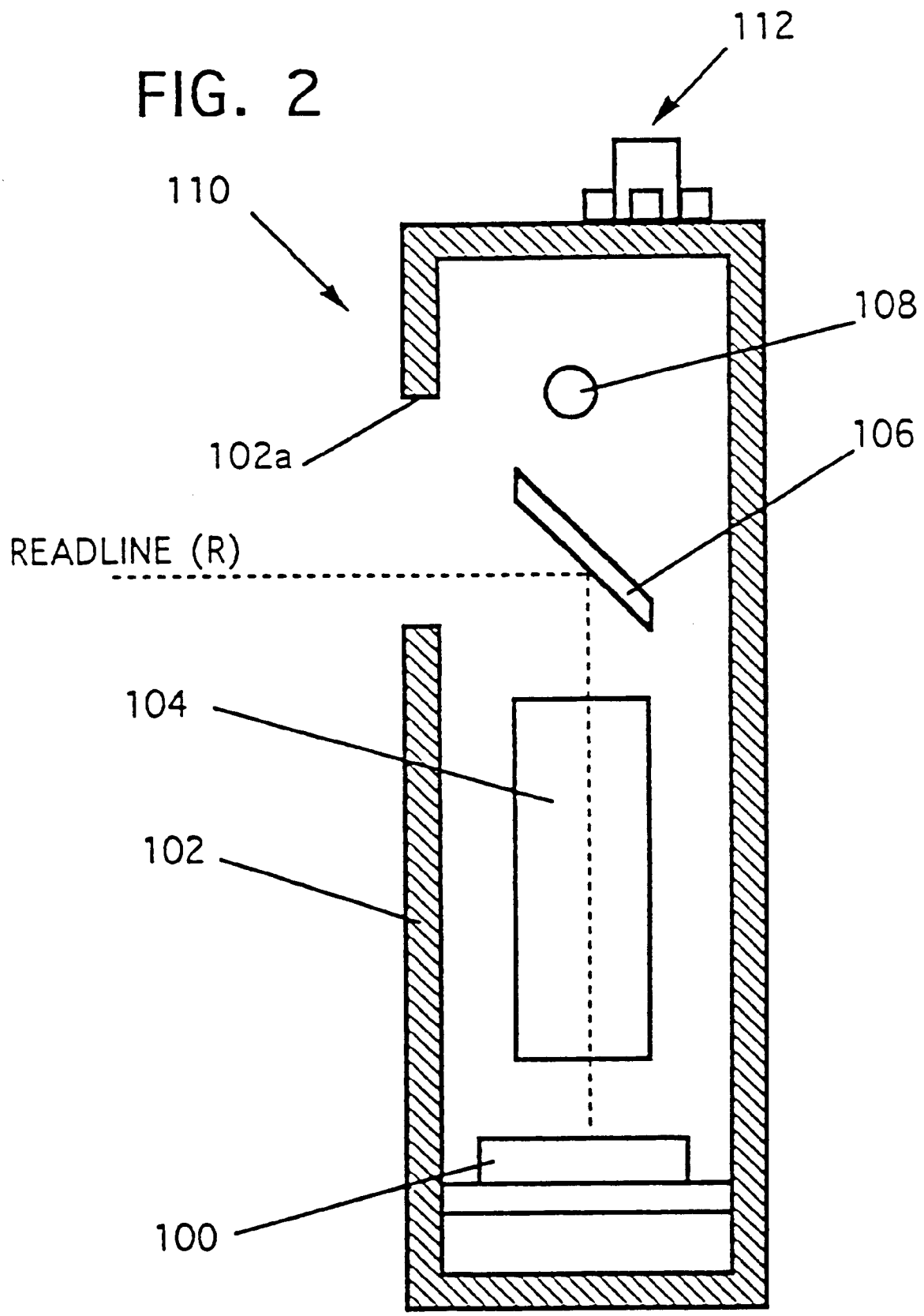
FIG. 2 is a schematic sectional side elevation showing an example of a plurality of active elements mounted within a unit housing and their relationship with an external target.

FIG. 2 shows a package arrangement 110 to which the inventive concept is applicable. This package arrangement comprises a sensor element 100 (in this case a CCD) which is housed in a plastic case 102 along with a lens assembly 104 and a mirror 106. The lens assembly and the mirror redirect and focus reflected light from a light source such as a light emitting diode 108, which has been reflected back from a target (not shown in this figure), onto the sensor element 100.

In this particular embodiment, the case 102 comprises two plastic moldings which enclose and support the active elements (by way of an unillustrated structure) and define a window 102a. The mirror 106 is supported within the housing 102 in a manner that redirects the readline (R) of the CCD device (sensor element 100) out through the window 102a toward a target which is located in the external environment.

Figure 4:
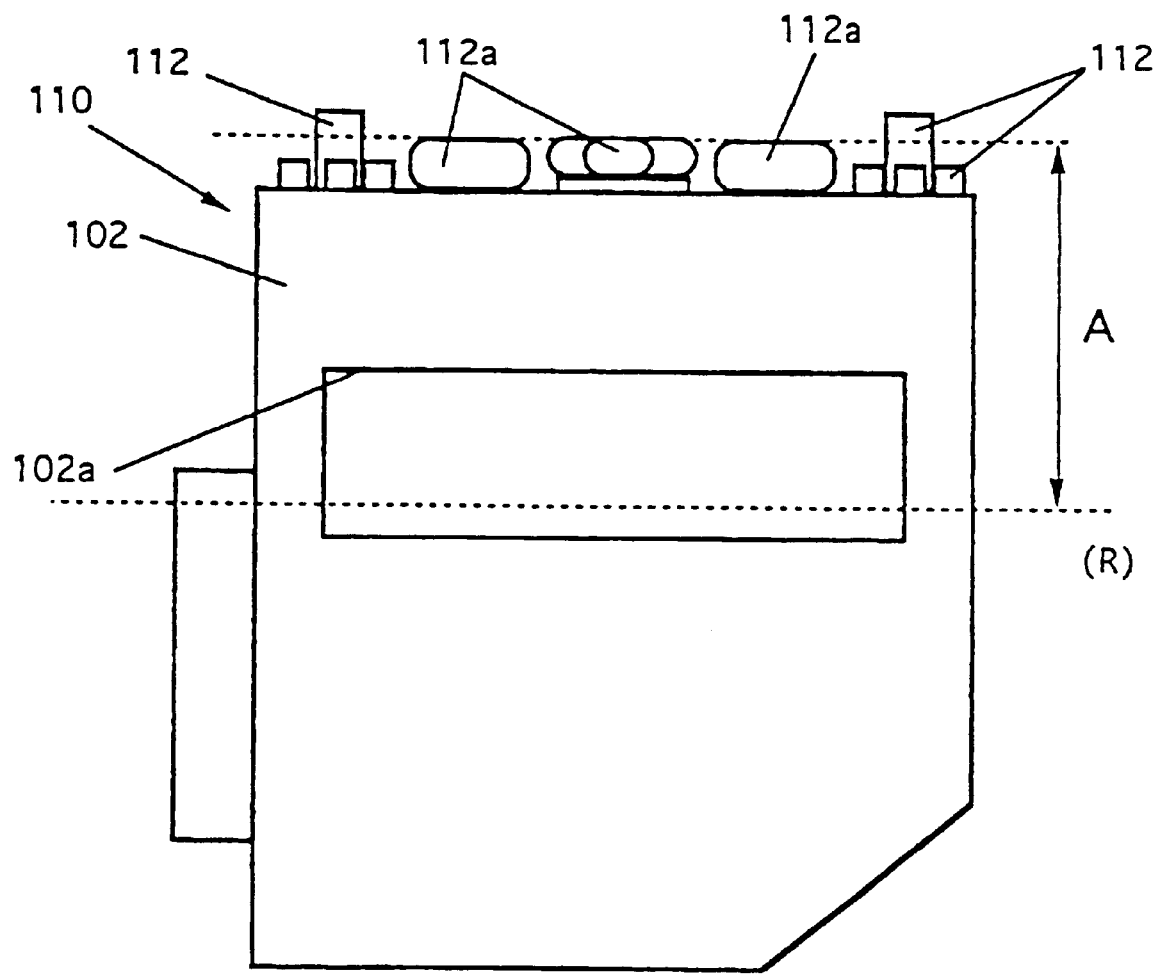
FIG. 4 is a front view showing the housing after the optimization process has been applied thereto.

In accordance with the present invention, the case 102 is formed with location features 112 which can be selectively deformed to create location faces (see #112a in FIG. 4). In this figure, only location features 112 which determine the vertical datum are shown.

Figure 3:
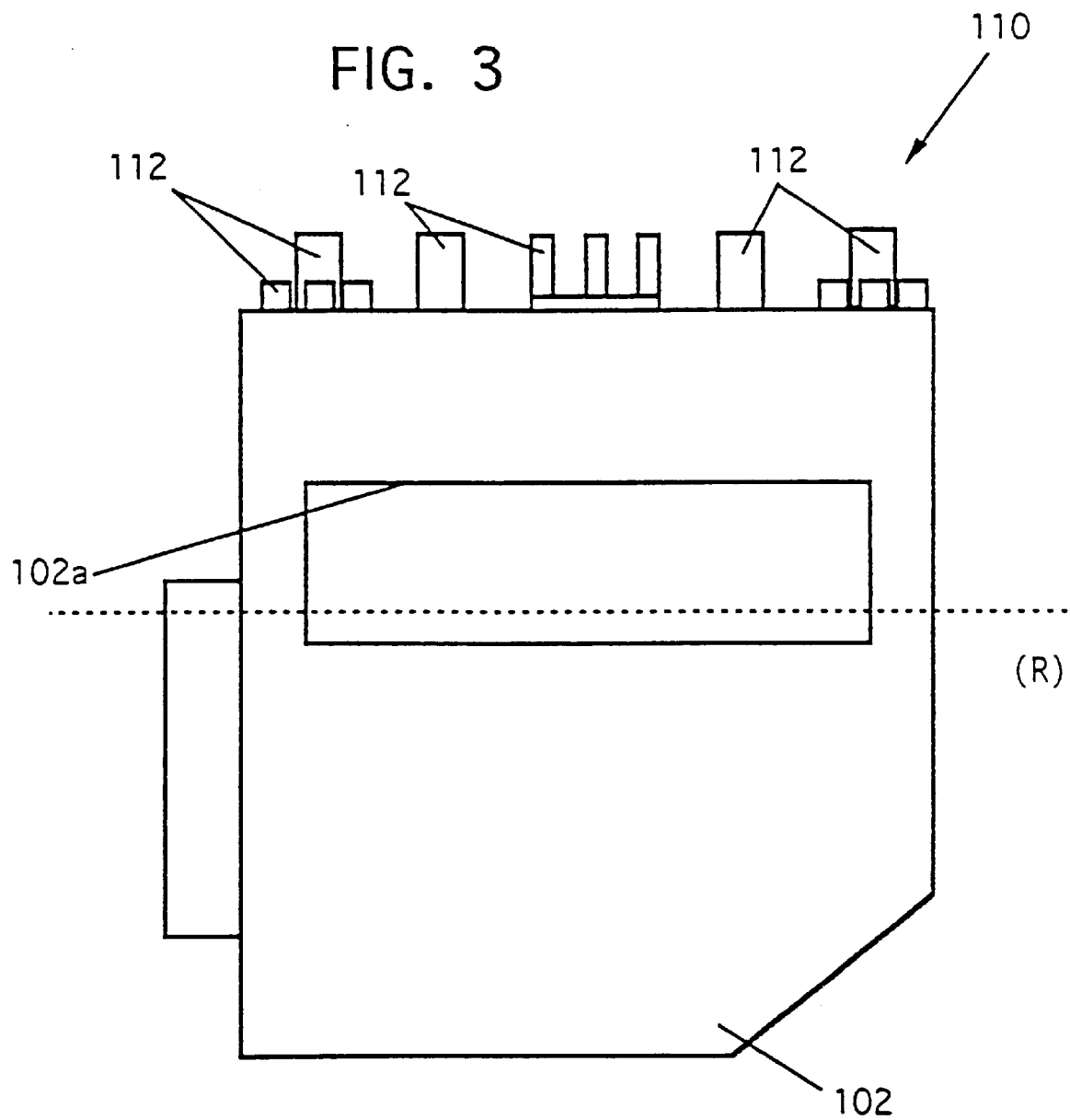
FIG. 3 is a front view showing the housing schematically depicted in FIG. 2 before the optimization process is applied to the mounting units.

The readline (R) of the CCD 100 varies from sensor to sensor and accordingly, in accordance with the present invention, after each package (case and active elements) 110, is assembled, it is supported in a suitable jig or the like, and moved with respect to a predetermined target until such time as the output of the sensor conforms with predetermined requirements and indicates that the assembly readline (R) is in an optimal position. Once the desired output of the sensor has been achieved, the location features on the case are permanently deformed by a swaging operation. In this instance, once the output of the sensor is detected as having assumed acceptable characteristics, ultrasonic welding horns, are moved into position and are used to deform the location features from the form shown in FIG. 3, to those shown in FIG. 4, and in a manner which will ensure that the relationship between the readline (R) and external case is set exactly. Alternatively, hot air staking can be used to swage the location features.

This optimization operation is such as to ensure that when the package 110 is operatively disposed in a device, such as a document scanner or the like, it will be supported in space in a manner wherein the active elements, e. g. the CCD 100, lens array 104 and mirror 106, are located in the desired positions wherein the readline (R) of the CCD 100 is a fixed known distance A from the location faces 112a. As will be appreciated, by supporting the readline (R) a predetermined distance from the point of contact between the location faces 112a and the mounting structure of the device, not shown, the optimal operation of the sensor will be assured.

Figure 5:
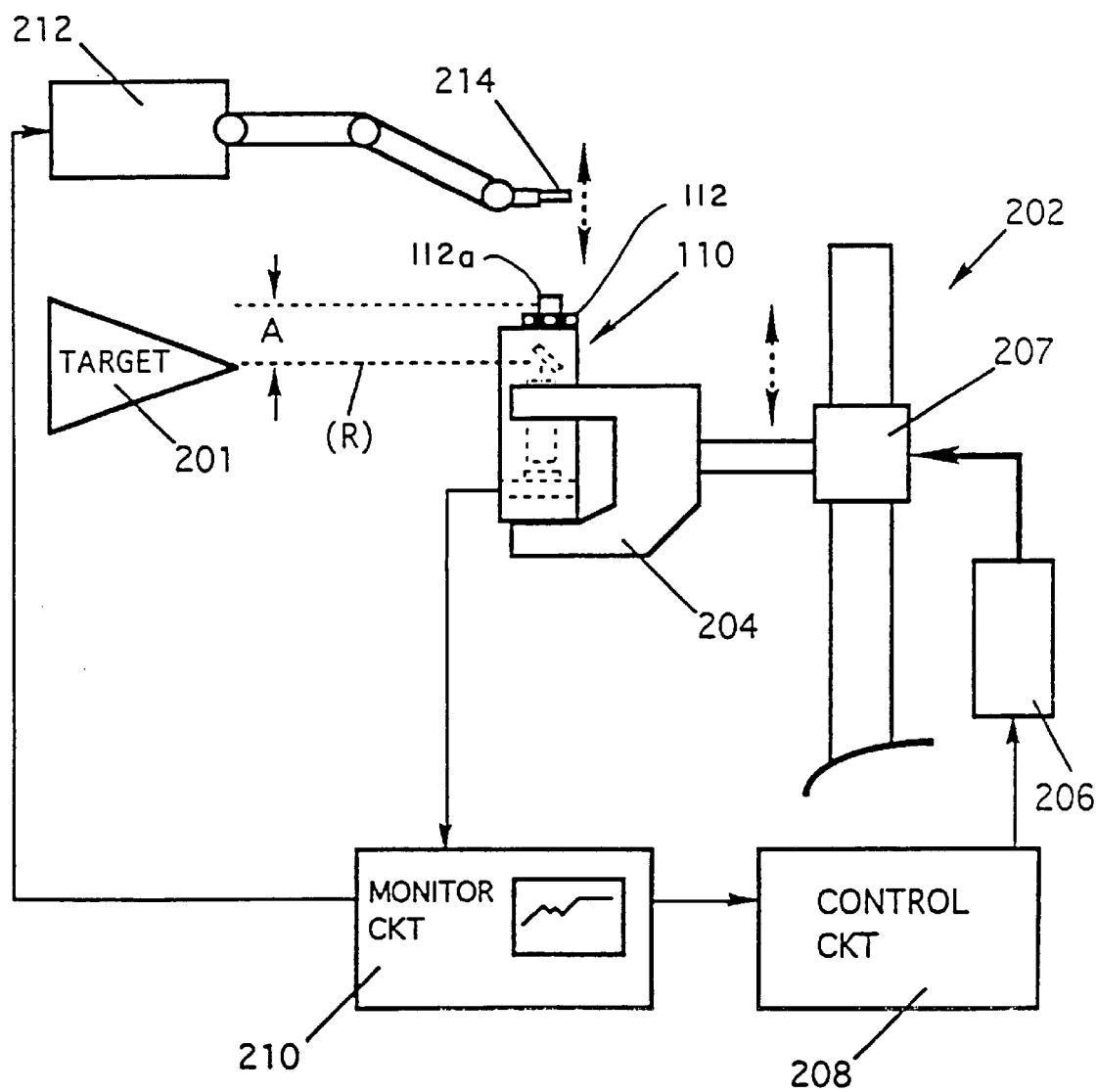
FIG. 5 is a schematic diagram illustrating an arrangement via which the concept that underlies the present invention can be implemented.

FIG. 5 schematically depicts an arrangement via which the relative positioning of the case and the deformation of the location features can be achieved in accordance with the present invention. In this arrangement, a target 201 is supported in an exactly known position with respect to a support mechanism, generally denoted by the numeral 202. This support mechanism 202 includes a cradle 204 or the like type of apparatus for holding the case, a servo arrangement 206 and a slide arrangement 207 which is operatively connected to the cradle in a manner which permits the cradle 204 to be moved relative to the target 201 in response to the operation of the servo 206. The operation of the servo 206 is controlled by a control circuit 208 which is responsive to an input from a monitoring apparatus 210 that receives and monitors the output of the sensor (e.g. CCD) 100. When the output of the sensor 100 is detected as having assumed an optimal value, the control circuit 208 responds and induces an ultrasonic welding device 212 to move a welding horn 214 into position over selected location features 112 formed on the case. The horn 214 is then lowered and used to heat and deform, the selected features on the case in a manner which forms location faces 112a at a distance A from the readline (R) of the sensor arrangement. That is to say, the position of the welding horn 214 is controlled to assume an exactly known spatial relationship with respect to the target 201 so that the location faces 112a are formed to be a predetermined distance A above the level of the target 201 which is now exactly aligned with the readline (R). This predetermined distance is, of course, variable in accordance with the dimensions of mounting structure of a device in which the case is to be operatively disposed.

It thus follows that when the package 110 is disposed in the above mentioned device, it will be supported by the interaction between the mounting structure, the undeformed location features 112 and the location faces 112a, in a position in which the sensor (CCD) 100 will be optimally located and supported, and wherein any errors in the construction and arrangement of the active elements within the case will be effectively negated.

Figure 6:
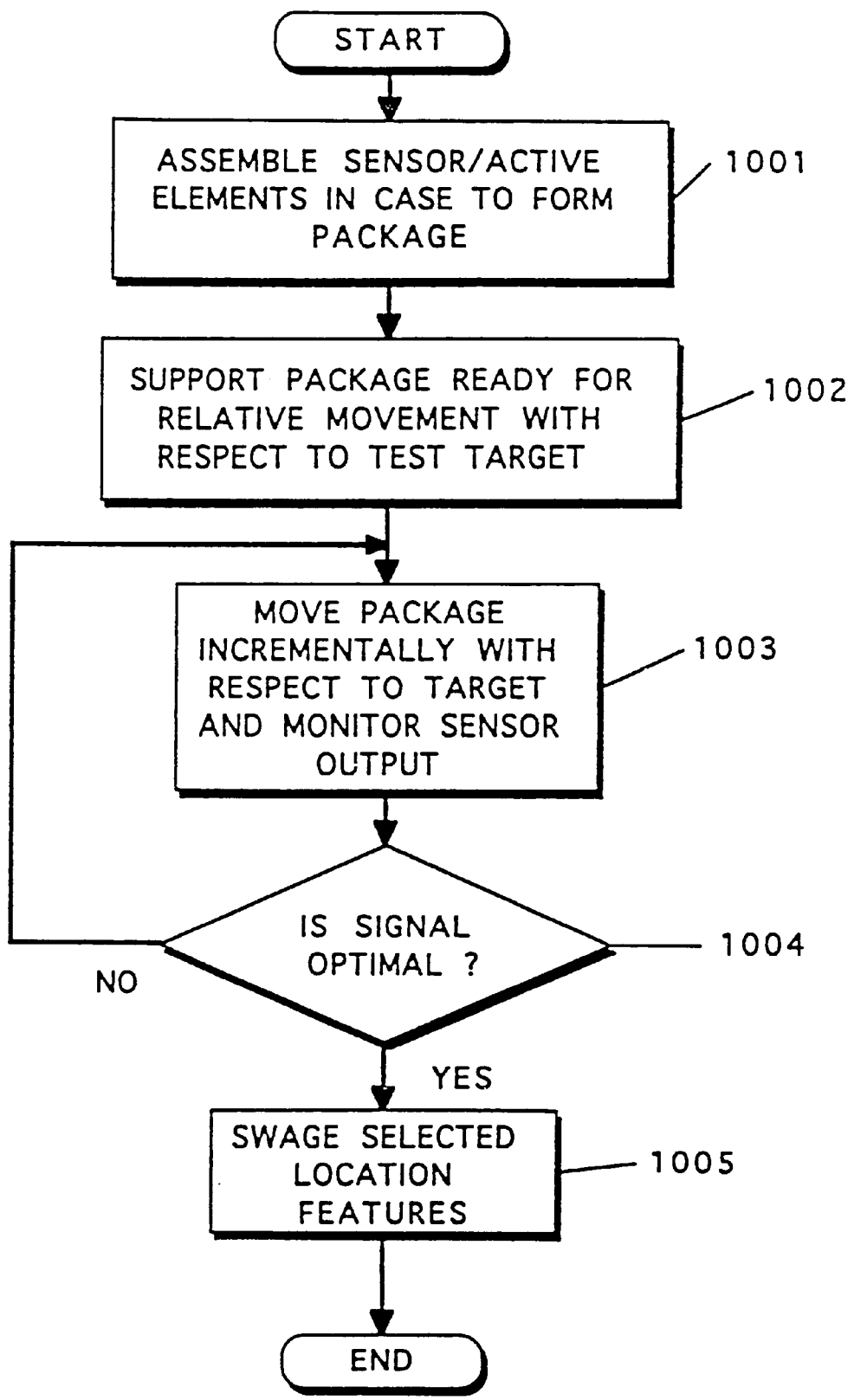
FIG. 6 is a flow chart depicting the sequence of operations which are carried in order to implement the present invention.

FIG. 6 shows, in flow chart form, the sequence of operations which are carried out in accordance with the present invention. As shown, the assembly of the active elements in the case to form the package 110, is carried out in step 1001.

Following this, the package is placed in a suitable apparatus which enables the position of the package 110 to be changed with respect to a target the position of which is exactly known. In this step (step 1002) the output of the sensor 100 is supplied to the monitoring apparatus 210. In step 1003 the package is moved incrementally with respect to the target 201 and the output of the sensor 100 is monitored. When the signal assumes an optimal/acceptable state as indicated by a YES in response to the enquiry carried out in step 1004, the movement of the package 110 is stopped and the swaging tool (welding horn 214) is moved into position and used, in step 1005 to deform selected location features 112 in a manner which forms location faces 112a, in a predetermined spatial relationship with respect to the target 201.

Because the casing 102 is supported in a predetermined spatial relationship wherein the output of the sensor 100 is optimal, and the mounting faces 112a are formed so as to have a known spatial relationship with the target 201, when the package 110 is disposed in an operative position in a device such as an optical scanner or the like, the active elements including the sensor 100, will, because of their inherent spatial relationship with the location faces, be located in optimal operative positions.

It will be appreciated that the arrangement disclosed in FIG. 5 is purely schematic and not necessarily indicative of any actual apparatus. For example, in FIG. 5, the apparatus is depicted as moving the case (package 110) vertically with respect to the target 201. The invention is by no means limited to such an arrangement, and it is within the scope of the present invention to lay the case face down on a horizontal track and move the case horizontally with respect to a target. Alternatively, the case may be held stationary and the target and the welding robot moved relative thereto.

What we claim:

1. A method of optimizing the manufacture of a sensor package, comprising the steps of:

forming a case with a permanently deformable location feature;

disposing a sensor within the case in a predetermined relationship with respect to the case;

selectively moving the case with respect to a target;

monitoring a response of the sensor to the target;

halting the movement of the case when the response of the sensor meets a predetermined requirement; and permanently deforming the location feature to form a location face which has a predetermined spatial relationship with the sensor, for locating the sensor in an optimal operating position when the case is mounted in a predetermined device.

2. A method as claimed in claim 1, wherein the step of permanently deforming comprises a swaging operation.

3. A method as claimed in claim 2, wherein the swaging operation is carried out using an ultrasonic welding horn.

4. A method as claimed in claim 3, further comprising the step of disposing one or more active elements, which cooperate with the sensor, in the case.

5. A method as claimed in claim 4, wherein the sensor comprises an optical sensing element.

6. Apparatus for optimising the manufacture of a sensor package, comprising:

means for supporting a case which has a permanently deformable location feature and in which a sensor is supported in a predetermined relationship with respect to the case;

means for selectively moving the case with respect to a target;

means for monitoring a response of the sensor to the target and for halting the movement of the case when the sensor response meets a predetermined requirement; and means for permanently deforming the selected location feature to form a location face which has a predetermined spatial relationship with the sensor, for locating the sensor in a predetermined operative position when the case is mounted in a predetermined device.

7. An optimising apparatus as claimed in claim 6, wherein the permanently deforming means comprises a swaging device.

8. A optimising apparatus as claimed in claim 7, wherein said swaging device comprises an ultrasonic welding horn.

* * * * *